United States Patent
Wendling

(10) Patent No.: US 11,044,886 B2
(45) Date of Patent: *Jun. 29, 2021

(54) CAT LITTER BOX MAT

(71) Applicant: Allan Wendling, New Lothrop, MI (US)

(72) Inventor: Allan Wendling, New Lothrop, MI (US)

(*) Notice: Subject to any disclaimer, the term of this patent is extended or adjusted under 35 U.S.C. 154(b) by 396 days.

This patent is subject to a terminal disclaimer.

(21) Appl. No.: 16/246,901

(22) Filed: Jan. 14, 2019

(65) Prior Publication Data

US 2020/0236898 A1   Jul. 30, 2020

Related U.S. Application Data

(63) Continuation of application No. 15/245,274, filed on Aug. 24, 2016, now Pat. No. 10,178,852.

(60) Provisional application No. 62/238,331, filed on Oct. 7, 2015.

(51) Int. Cl.
    *A01K 1/015*   (2006.01)
    *A01K 1/01*    (2006.01)

(52) U.S. Cl.
    CPC .............. *A01K 1/0157* (2013.01); *A01K 1/01* (2013.01); *A01K 1/0107* (2013.01)

(58) Field of Classification Search
    CPC ..... A01K 1/0157; A01K 1/015; A01K 1/0107
    See application file for complete search history.

(56) References Cited

U.S. PATENT DOCUMENTS

| | | |
|---|---|---|
| 1,773,141 A | 8/1930 | Ensley |
| 3,626,900 A | 12/1971 | Failla |
| 4,147,129 A | 4/1979 | Ruplen |
| 4,640,225 A | 2/1987 | Yananton |
| 4,800,841 A | 1/1989 | Yananton et al. |
| 5,053,124 A | 10/1991 | Liane |
| 5,080,046 A | 1/1992 | Cassone |
| 5,797,347 A | 8/1998 | Ochi |
| 5,819,688 A | 10/1998 | Walker |
| 5,881,677 A | 3/1999 | Schmitt |
| 6,220,205 B1 | 4/2001 | Massie |
| 6,367,423 B1 | 4/2002 | Scheuer |
| 7,207,293 B2 | 4/2007 | Deming, Jr. |
| 8,033,249 B1 | 10/2011 | Cook et al. |
| 8,336,497 B2 | 12/2012 | van Zuilekom |
| D745,749 S | 12/2015 | Lee |
| 2001/0042518 A1 | 11/2001 | Ikegami et al. |
| 2003/0094140 A1 | 5/2003 | Otsuji et al. |
| 2009/0000557 A1 | 1/2009 | Takahashi et al. |
| 2010/0300367 A1 | 12/2010 | Askinasi |
| 2015/0164041 A1 | 6/2015 | Takahashi et al. |

(Continued)

OTHER PUBLICATIONS

BlackHole Litter Mat Blackhole Cat Litter Mat (https://www.amazon.com/Moonshuttle-Blackhole-Rectangular-Litter-Mat/dp/B00G67FD6W/ref=sr_1_1?keywords=B00G67FD6W&qid=1582216037&s=pet-supplies&sr=1-1), 11 pages, Jul. 2, 2020.

(Continued)

*Primary Examiner* — Monica L Barlow
(74) *Attorney, Agent, or Firm* — Dinsmore & Shohl, LLP

(57) ABSTRACT

A pet litter box mat having a first planar layer which overlaps and covers a second planar layer. The layers are connected together by hinges. A plurality of openings are formed through the first layer and these openings increase in area from a side of the first mat which abuts the second mat to the other side of the first mat.

20 Claims, 1 Drawing Sheet

(56) References Cited

U.S. PATENT DOCUMENTS

2015/0296741 A1  10/2015  Komuro et al.
2016/0229324 A1  8/2016  Lee

OTHER PUBLICATIONS

Moonshuttle Blackhole Rectangular Cat Litter Mat by Kindle Customer on Mar. 3, 2015 https://www.amazon.com/gp/customer-reviews/R2EV3IGKKZC41H/ref=cm_cr_arp_d_rvw_ttl?ie=UTF8 &ASIN=B00G67FD6W.
Genevieve Burke, First Amazon Review on Amazon.com of Blackhole Litter Mat—Moonshuttle Rectangular Cat Litter Mat, 30×23-Inch, Dark Gray, "This Blackhole Cat Litter Mat is awesome. All of the left over cat litter from our cats coming out of their cat box stays on the mat and then dumping the cat litter out is fast and easy!", Dec. 4, 2013, 4 pages, (https://www.amazon.com/Moonshuttle-Blackhole-Rectangular-Litter-Mat/product-reviews/B00G67FD6W/ref=cm_cr_getr_d_paging_btm_next_217?ie=%E2%80%A6).
Daehee Lee, YouTube video of Blackhole Cat Litter Mat Litter Box Mat Innovative Dual Structure, Nov. 5, 2013, 13 pages, (https://www.youtube.com/watch?v=-JhbvuyAqP0).
Floppycats.Com, Moonshuttle Blackhole Cat Littler Mats, Jul. 5, 2014, 16 pages, (https://www.floppycats.com).
Hauspanther, BlackHole Litter Mat Really Traps Cat Litter!, Aug. 19, 2014, 12 pages, (https://www.hauspanther.com/2014/08/19/blackhole-litter-mat-really-traps-cat-litter/).

CAT LITTER BOX MAT

CROSS-REFERENCE TO RELATED APPLICATIONS

This application is a continuation application of U.S. Pat. No. 10,178,852 issued Jan. 15, 2019, which claims priority to U.S. Provisional Patent Application 62/238,331 filed Oct. 7, 2015, the contents of which are both incorporated herein by reference.

BACKGROUND OF THE INVENTION

I. Field of the Invention

The present invention relates to a cat litter box.

II. Description of Related Art

Many people in the United States and elsewhere own one or more cats as pets. Many cats, furthermore, are house pets and spend most if not all of their time within the house.

In order to keep cats within the house, however, it is necessary to establish a litter box and train the cats to use the litter box for their lavatory functions. These cat litter boxes are typically filled with cat litter, such as wood or paper chips, which are water absorbent.

Ideally, all of the cat litter together with all of the material left by the cat remains within the litter box. After a period of time, the litter in the litter box is typically cleaned and replaced with fresh litter.

However, even though ideally all of the cat litter remains within the litter box, in practice some litter oftentimes adheres to the paws of the cat. Consequently, when the cat leaves the litter box, litter which adheres to the paws of the cat travels with the cat when the cat leaves the litter box. This litter eventually falls off within the home outside the litter box which creates not only an unsightly, but also unsanitary, mess.

In order to contain the cat litter near the cat litter box, there have been previously known cat litter pads which are placed adjacent the litter box so that cats using the litter box must walk across the litter pad. The litter pad typically contains a plurality of openings arranged in an array so that cat litter that adheres to the paws of the cat will drop through the holes for easy collection under the cat litter pad.

These previously known cat litter pads, however, have not proven wholly successful in use. One disadvantage of the previously known cat litter pads is that the cat litter pad must be constructed so that the grid which supports the cat as the cat walks across the pad must be of sufficient size not only to support the cat, but also to provide long life for the cat pad. As such, the wall thickness for the grid must be sufficiently large which, in turn, reduces the size of the holes formed by the grid walls. The reduction in the hole size reduces the overall amount of area on the cat litter pad to receive and channel cat litter through the pad and to an underlying collection area. This, in turn, reduces the efficiency of removing the litter from the cat's paws.

Simply reducing the wall thickness for the grid, and thus increasing the size of the holes formed by the grid, results in an overall construction for the grid forming the cat litter pad that is flimsy and subject to rapid wear and tear. Such a flimsy cat litter pad exhibits a useful life that is unacceptable.

A still further disadvantage of the previously known cat litter pads is that the previously known cat litter pads are subject to urine from the cat. Such cat litter pads are often made from an elastomeric material which soaks up the urine from the cat. This, in turn, results in an undesirable odor from the cat litter pad. When the level of the odor becomes unacceptable, it is necessary to replace the cat litter pad with a new one.

SUMMARY OF THE PRESENT INVENTION

The present invention provides a cat litter mat which overcomes the above-mentioned disadvantages of the previously known litter mats.

In brief, the cat litter mat of the present invention is generally rectangular in shape and formed from an elastomeric material. The cat litter mat contains two generally planar layers, namely an upper layer and a lower layer. The upper layer is disposed over and overlies the lower layer.

The upper layer comprises a grid forming a plurality of openings from the top and to the bottom of the upper layer. Unlike the previously known cat litter mats, however, the openings, which are generally hexagonal in shape, taper inwardly from the top and to the bottom of the upper layer. By doing this, the upper layer of the mat effectively increases the overall area of the openings thus maximizing the amount of litter which is removed by the cat's paws as the cat walks across the mat. However, since the bottom of the holes in the upper layer are thicker, the overall cat litter mat enjoys a durability that equals or exceeds the previously known cat mats. Furthermore, the size of the opening at the lower side of the upper layer of the cat mat is still sufficiently large to allow cat litter to freely pass through the mat and to the lower layer.

The lower layer of the cat litter mat has a continuous top surface to receive and support cat litter that falls through the upper grid layer and to the lower layer. The lower layer, furthermore, may be covered by additional protection. In use, the cat walks across the cat mat as the cat exits from the cat litter box. Any cat litter that adheres to the paws of the cat simply travels through the upper grid and to the lower layer. After a period of time, the cat litter mat may be easily cleaned by simply raising the grid away from the lower layer and placing the collected litter on the lower layer into the appropriate trash receptacle.

In addition, the entire cat litter mat is covered with a water repellant. The water repellant thus repels urine and enables quick and complete cleaning of the cat litter mat.

BRIEF DESCRIPTION OF THE DRAWING

A better understanding of the present invention will be had upon reference to the following detailed description when read in conjunction with the accompany drawing, wherein like reference characters refer to like parts throughout the several views, and in which.

DETAILED DESCRIPTION OF A PREFERRED EMBODIMENT OF THE PRESENT INVENTION

Figure 1:
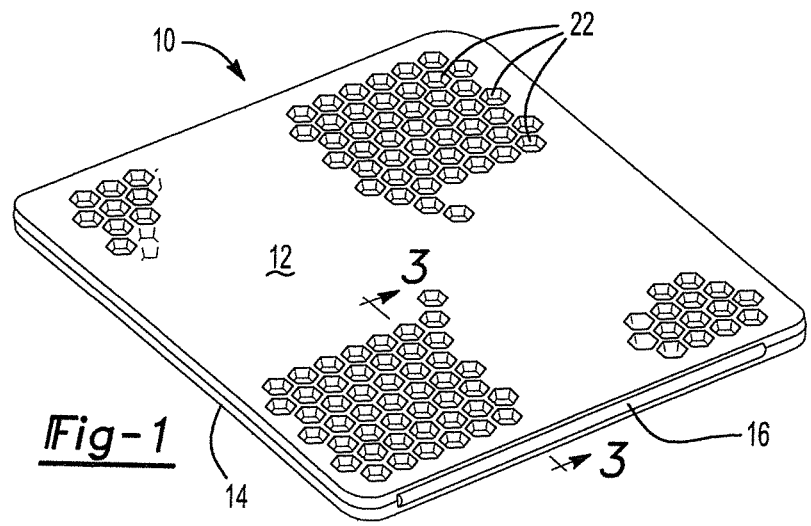
FIG. 1 is an elevational view illustrating the cat litter mat in an operational position.

With reference first to FIG. 1, a preferred embodiment of a cat litter mat 10 is shown. The cat litter mat 10 includes a planar upper layer 12 and a planar lower layer 14. Both of the layers 12 and 14 are generally planar and rectangular in shape and are made of a synthetic, waterproof material such as plastic, nylon, and the like.

Figure 2:
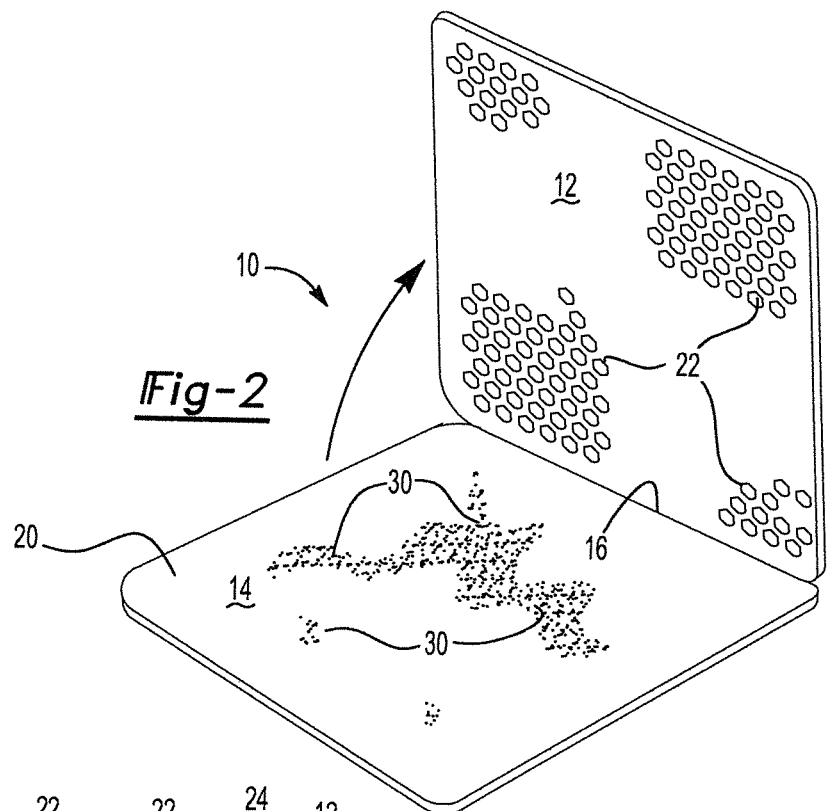
FIG. 2 is a view similar to FIG. 1, but illustrating the cat litter mat in a cleaning position.

As best shown in FIG. 2, the upper layer 12 and lower layer 14 are pivotally connected together along one edge by a hinge 16. Thus, the upper layer 12 is movable between an in use position, illustrated in FIG. 1 in which the upper layer 12 flatly abuts against and overlies the lower layer 14, and a cleaning position, illustrated in FIG. 2 in which the upper layer 12 is pivoted away from the lower layer 14 thus exposing an upper surface 20 of the lower layer 14.

Figure 3:
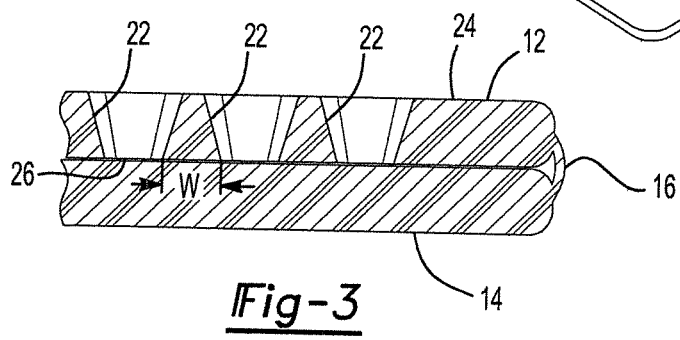
FIG. 3 is a sectional view taken substantially along line 3-3 in FIG. 1 and enlarged for clarity.

With reference now to FIGS. 1 and 3, a plurality of openings 22 are formed between an upper surface 24 and a lower surface 26 of the upper layer 12. These openings 22, furthermore, are generally hexagonal in shape and are arranged in a grid pattern so that the width of the sidewall forming the holes 22 remains substantially constant throughout the grid.

As best shown in FIG. 3, the holes 22 taper inwardly from the upper surface 24 and to the lower surface 26 of the upper layer 12. Thus, the size of the openings at the upper surface 24 of the upper layer 12 is much larger than the total area of the openings 22 at the lower side 26 of the upper layer 12. However, the size of the openings 22 at the lower surface 26 of the upper layer 12 is still sufficiently large to allow cat litter to pass freely through the holes 22.

With reference now to FIG. 2, the lower layer 14 has a continuous flat upper surface 20. This upper surface 20 is constructed of a water repellant material. In use, furthermore, an additional waterproof layer may be placed in between the upper layer 12 and lower layer 14 of the cat litter mat 10.

In use, the upper layer 12 is moved to the position shown in FIG. 1 in which the upper layer 12 overlies the lower layer 14 of the cat mat 10. The mat 10 is then positioned adjacent the cat litter box (not shown) so that the cat exiting from the cat litter box will pass across the mat 10.

During use, as the cat passes across the cat litter mat 10, cat litter which adheres to the paws of the cat will drop off the paws and fall through the holes 22 in the upper layer 12 of the cat litter mat 10.

With reference now to FIG. 2, after prolonged use, the upper mat 12 is pivoted to its open position thus exposing the upper surface of the lower layer 14. After prolonged use, cat litter 30 will have accumulated on the top surface 28 of the lower layer 14. This cat litter 30, however, may be easily disposed of by simply dumping the cat litter 30 in the appropriate trash receptacle.

Due to the tapered shape of the holes 22, the relatively wide area of opening provided in the top surface of the cat mat 10 ensures that essentially all of the cat litter that adheres to the cat's paws will be removed by the mat 10 and drop through the holes 22 to the lower layer 14 of the cat litter mat. However, the increased width W (FIG. 3) of the grid walls at the bottom surface 26 of the upper layer 12 provides sufficient durability and long life of use for the cat mat.

Preferably, both the upper layer 12 and lower layer 14 of the cat mat are constructed of an elastomeric material. Once constructed, both layers 12 and 14 are treated with a water repellant substance which prevents the urine from the cat from soaking into the cat litter mat 10. The water repellant material also provides for easy cleaning of the cat litter mat 10 when desired.

Having described my invention, however, many modifications thereto will become apparent to those skilled in the art to which it pertains without deviation from the spirit of the invention as defined by the scope of the appended claims.

I claim:

1. A pet mat comprising:
   a first planar layer constructed of a synthetic material, said first layer having an upper surface,
   a second planar layer constructed of a synthetic material, said second planar layer having an upper surface and an opposite lower surface, said second planar layer connected to said first planar layer to move between a use position and an open position, in said use position said lower surface of the second planar layer overlays said upper surface of said first planar layer, and in said open position said upper surface of said first planar layer is exposed, and
   a plurality of spaced openings extending entirely through said second planar layer, said openings increasing in cross sectional area from said lower surface of said second planar layer to said upper surface of said second planar layer.

2. The pet mat of claim 1 wherein a side edge of said first planar layer is connected to a side edge of said second planar layer.

3. The pet mat of claim 2 wherein said side edge of said first planar layer is pivotally connected to said side edge of said second planar layer.

4. The pet mat of claim 3 and including a hinge which pivotally connects said side edge of said first planar layer to said side edge of said second layer.

5. The pet mat of claim 4 wherein said first planar layer, said second planar layer and said hinge are of a one piece construction.

6. The pet mat of claim 1 wherein said openings are hexagonal in shape.

7. A pet mat comprising:
   a first planar layer constructed of a synthetic material, said first layer having an upper surface,
   a second planar layer constructed of a synthetic material, said second planar layer having an upper surface and an opposite lower surface, said second planar layer connected to said first planar layer to move between a use position and an open position, in said use position said lower surface of the second planar layer abuts said upper surface of said first planar layer, and in said open position said upper surface of said first planar layer is spaced apart from said lower surface of said second planar layer, and
   a plurality of spaced openings extending entirely through said second planar layer, said openings increasing in cross sectional area from said lower surface of said second planar layer to said upper surface of said second planar layer.

8. The pet mat of claim 7, wherein said plurality of openings permit access through said second planar layer to said upper surface of said first planar layer in said use position.

9. The pet mat of claim 7, wherein a side edge of said first planar layer is connected to a side edge of said second planar layer.

10. The pet mat of claim 7, wherein said side edge of said first planar layer is pivotally connected to said side edge of said second planar layer.

11. The pet mat of claim 10, wherein a hinge pivotally connects said side edge of said first planar layer to said side edge of said second planar layer.

12. The pet mat of claim 7, wherein each of said plurality of openings taper from said upper surface of said second planar layer to the lower surface of said second planar layer.

13. The pet mat of claim 7, wherein each of said plurality of openings have a generally hexagonal shape at said upper surface of said second planar layer and at said lower surface of said second planar layer.

14. The pet mat of claim 13, wherein a space between adjacent openings at said lower surface of said second planar layer is larger than a space between adjacent openings at said upper surface of said second planar layer.

15. A pet mat consisting of:
- a first planar layer constructed of a synthetic material, said first layer having an upper surface and an opposite lower surface,
- a second planar layer constructed of a synthetic material, said second planar layer having an upper surface and an opposite lower surface, said second planar layer connected to said first planar layer to move between a use position and an open position, in said use position said lower surface of the second planar layer overlays said upper surface of said first planar layer, and in said open position at least a portion of said upper surface of said first planar layer is exposed, and
- a plurality of spaced openings extending entirely through said second planar layer, said openings increasing in cross sectional area from said lower surface of said second planar layer to said upper surface of said second planar layer.

16. The pet mat of claim 15 wherein a side edge of said first planar layer is connected to a side edge of said second planar layer.

17. The pet mat of claim 16 wherein said side edge of said first planar layer is pivotally connected to said side edge of said second planar layer.

18. The pet mat of claim 17 and including a hinge which pivotally connects said side edge of said first planar layer to said side edge of said second layer.

19. The pet mat of claim 18 wherein said first planar layer, said second planar layer and said hinge are of a one piece construction.

20. The pet mat of claim 15 wherein said openings are hexagonal in shape.

* * * * *